United States Patent [19]

Carroll et al.

[11] Patent Number: 4,467,859
[45] Date of Patent: Aug. 28, 1984

[54] ENERGY EFFICIENT BUILDING STRUCTURE AND PANEL THEREFOR

[75] Inventors: Thomas J. Carroll, Birmingham, Mich.; James K. Paisley, New York, N.Y.

[73] Assignee: General Motors Corporation, Detroit, Mich.

[21] Appl. No.: 253,232

[22] Filed: Apr. 13, 1981
(Under 37 CFR 1.47)

[51] Int. Cl.$^3$ .............................. F24D 5/00; F24J 3/02
[52] U.S. Cl. .................................... 165/57; 165/48 S; 126/431; 126/430; 52/309.7; 52/309.11; 52/572; 52/579; 52/580; 52/782
[58] Field of Search .................. 165/48 S; 62/235.1, 62/DIG. 13; 52/309, 403, 173, 809, 782, 220, 582, 585, 578, 579, 580; 126/436, 431; 98/31

[56] References Cited

U.S. PATENT DOCUMENTS

| | | | |
|---|---|---|---|
| 1,733,758 | 10/1929 | Sealey | 52/403 |
| 2,710,081 | 6/1955 | Fink | 52/578 |
| 2,794,756 | 6/1957 | Leveranz | 52/309.6 |
| 3,283,456 | 11/1966 | Carlton | 52/220 |
| 3,748,801 | 7/1973 | Constantinescu | 52/173 |
| 3,932,976 | 1/1976 | Steel | 52/309 |
| 4,167,089 | 9/1979 | Camus | 52/309.7 |
| 4,197,993 | 4/1980 | Trombe et al. | 165/48 S |
| 4,295,415 | 10/1981 | Schneider, Jr. | 52/309.12 |
| 4,341,917 | 7/1982 | Martin | 126/436 |

FOREIGN PATENT DOCUMENTS

| | | | |
|---|---|---|---|
| 2418415 | 2/1979 | France | 52/309.4 |
| 0124867 | 5/1949 | Sweden | 52/782 |

*Primary Examiner*—Albert W. Davis, Jr.
*Attorney, Agent, or Firm*—C. K. Veenstra

[57] ABSTRACT

A building structure is constructed from a plurality of sheathed, foam cored structural panels which are adapted to receive solar energy conversion or heat storage devices and are adapted to be connected in an air flow loop to provide integral heating and/or cooling systems for the building structure.

2 Claims, 14 Drawing Figures

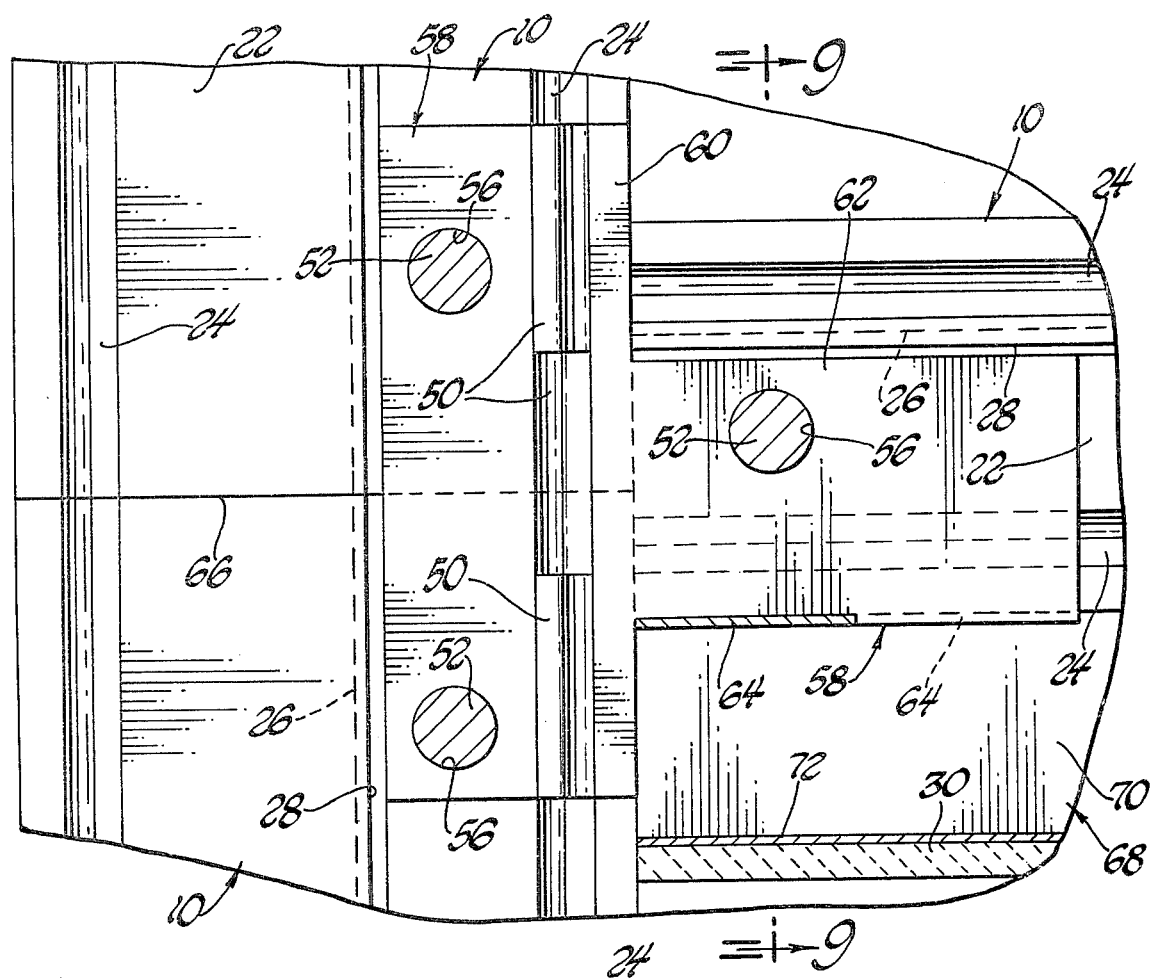
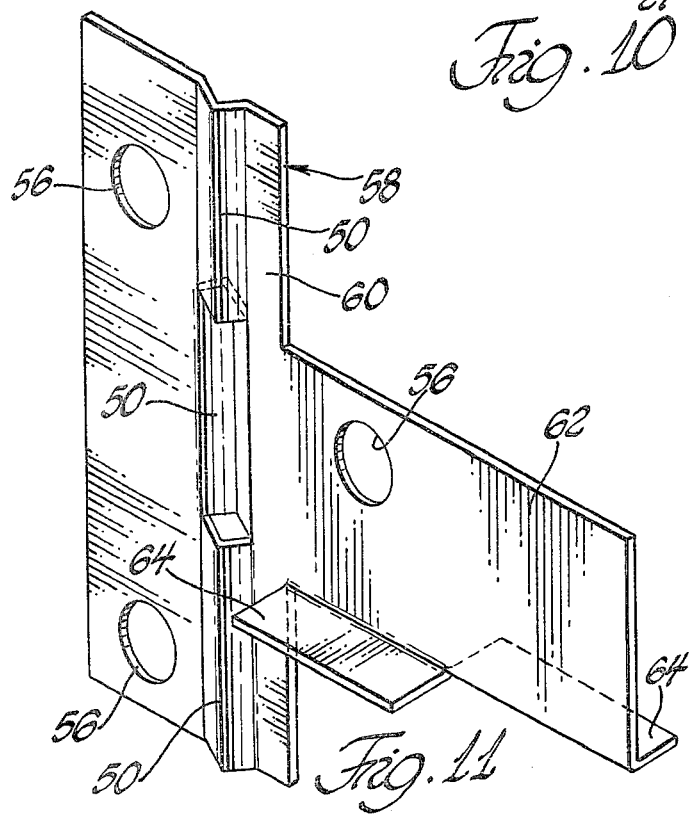
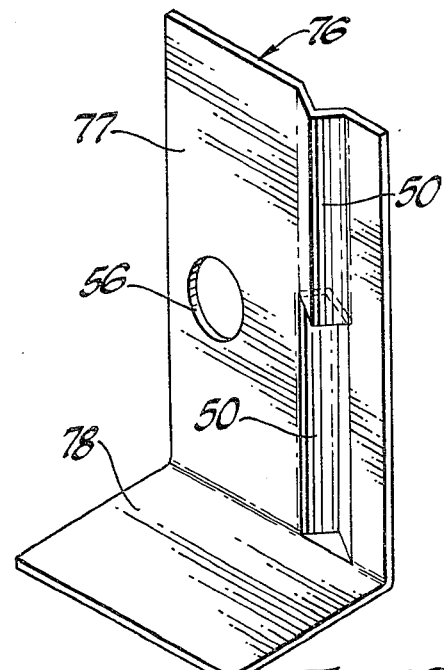

ENERGY EFFICIENT BUILDING STRUCTURE AND PANEL THEREFOR

TECHNICAL FIELD

This invention relates to an energy efficient building structure, and to an improved structural panel for use in such a building structure, which are particularly adapted to facilitate use of solar energy conversion and heat storage devices.

SUMMARY OF THE INVENTION

This invention provides an improved structural panel suitable for use in constructing an energy efficient building structure.

A structural panel according to this invention comprises a sheathed foam core formed into an open celled unit having a major expanse and a pair of flanges projecting from the plane of the major expanse along opposite edges thereof. Such a panel may be assembled with other such panels to form an insulated self-supporting section of a building structure. The structural integrity of the sheathed foam core precludes the need for a separate supporting framework, and the superior insulating characteristics of the foam core preclude the need for separate insulating materials.

This invention further provides an energy efficient building structure constructed from that panel.

An energy efficient building structure according to one aspect of this invention comprises a plurality of such panels assembled by securing the flanges of one panel to adjacent flanges of other panels so that the major expanses of the panels form an insulated self-supporting section of the building structure. Covering members are secured to the flanges of at least some of the panels to create closed cell units having air ducts therethrough, and the air ducts are connected in an air flow loop. One or more of the units includes heat transfer means which heat or cool air flowing through the loop in order that the air flow may heat or cool another region of the building structure.

An energy efficient building structure according to another aspect of this invention comprises a plurality of such panels assembled by securing the flanges of one panel to adjacent flanges of other panels so that the major expanses of the panels form an insulated self-supporting roof section of the building structure, the flanges projecting upwardly so that the roof section is adapted to readily receive solar energy conversion modules.

A particular feature of the panel provided by this invention lies in the use of an inner sheath which covers the inner surface and a portion of the lateral surfaces of the panel and an outer sheath which covers the outer surface and the remaining portion of the lateral surfaces of the panel. The sheaths have longitudinally extended edges which overlap to protect the foam core but are spaced apart to minimize heat transfer between the inner sheath and the outer sheath.

The details as well as other features and advantages of this invention are set forth in the remainder of the specification and are shown in the accompanying drawings.

SUMMARY OF THE DRAWINGS

FIG. 10 is a view, taken along line 10—10 of FIG. 9, showing a plate which aligns the floor and wall panels;

FIG. 11 is an isometric view of the FIG. 10 plate;

FIG. 12 is an isometric view of a clip which may be used to align two wall panels on a foundation;

BEST MODE FOR CARRYING OUT THE INVENTION

Figure 1:
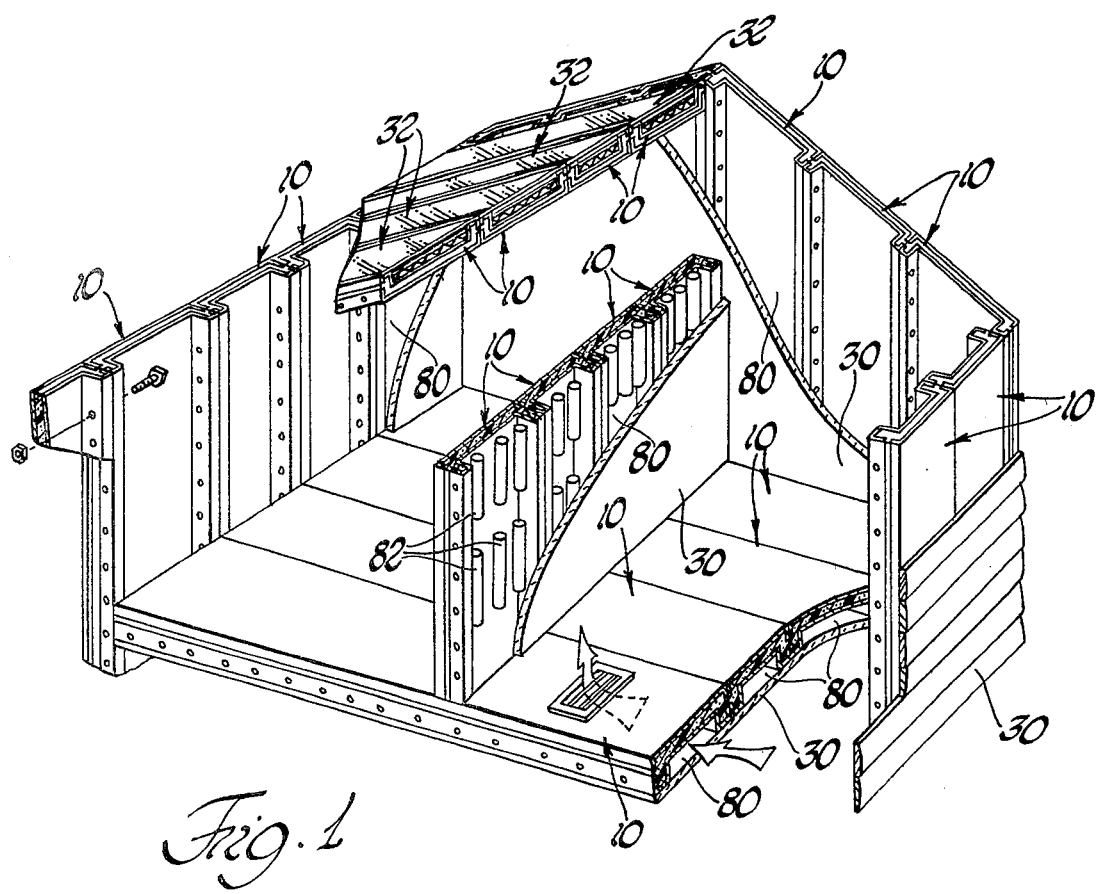
FIG. 1 is a schematic isometric view of a building structure constructed from the improved panels, with parts broken away to illustrate various aspects of its construction.
Figure 2:
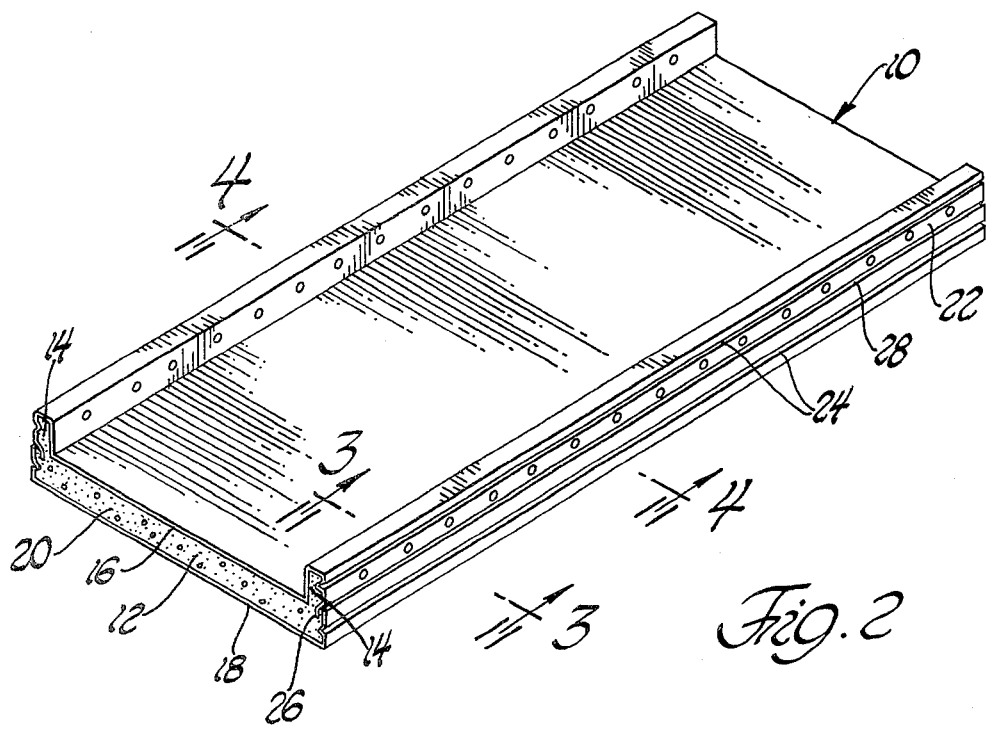
FIG. 2 is an isometric view of the improved structural panel.

As shown in FIG. 1, this invention provides an energy efficient building structure constructed from a plurality of panels 10. Each panel, illustrated in greater detail in FIGS. 2-4, includes a major expanse 12 and a pair of flanges 14 projecting from the plane of expanse 12 along opposite edges thereof. The flanges 14 of one panel are secured to adjacent flanges 14 of other panels so the major expanses 12 of the panel assembly form a wall, roof or floor section of the building structure.

Each panel has a sheet metal inner sheath 16 and a sheet metal outer sheath 18 which are roll formed to provide the desired panel configuration and between which a polyurethane core 20 is foamed and cured. The sheathed foam core provides structural integrity permitting panel 10 to serve as a structural load bearing member of the building structure and the assembly of several panels to provide an insulated, self-supporting wall, roof or floor section of the building structure.

Figure 3:
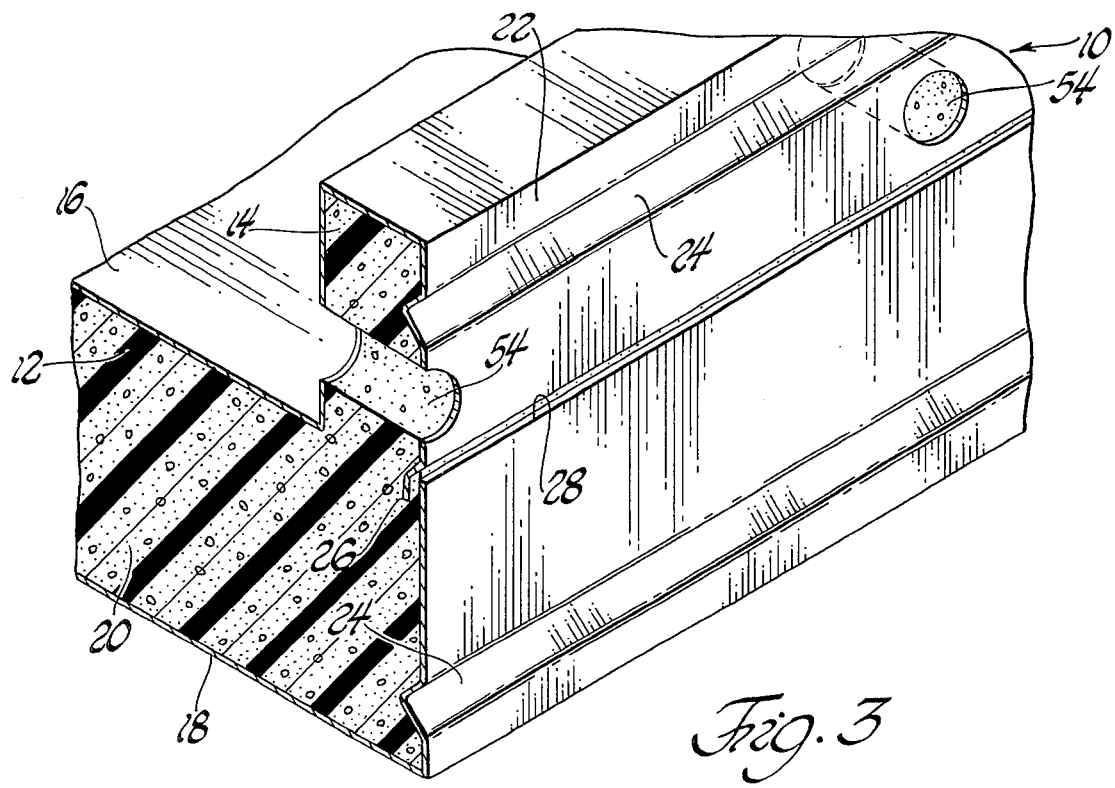
FIG. 3 is an enlarged isometric view, taken in section along line 3—3 of FIG. 2, showing certain details of construction of the panel.
Figure 4:
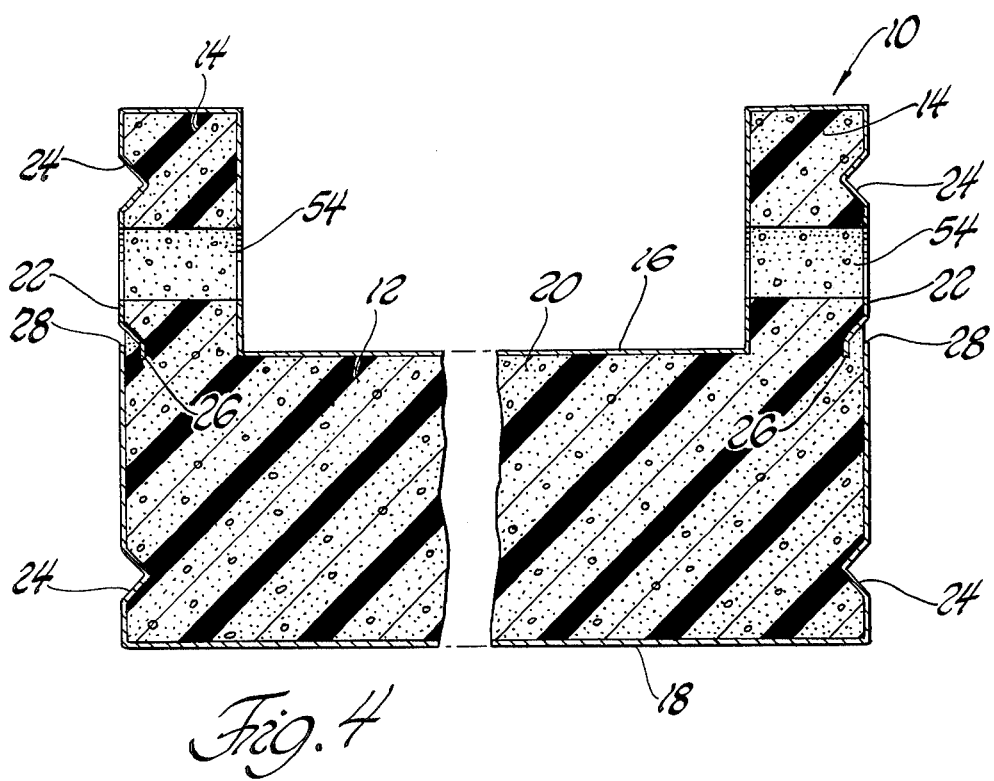
FIG. 4 is a transverse sectional view of the panel, taken along line 4—4 of FIG. 2, further showing details of its construction.

As shown, particularly in FIGS. 3 and 4, the lateral surfaces 22 of panel 10 include V-shaped grooves 24 designed to receive the sealing and aligning devices described below. As also shown in these figures, the longitudinally extending edges 26 and 28 of inner sheath 16 and outer sheath 18 overlap to protect foam core 20 and are spaced from one another to minimize heat transfer between inner and outer sheaths 16 and 18.

As panels 10 are assembled into wall, roof and floor sections of the building structure, they provide U-shaped open cell units allowing full access for installation of utilities such as power, gas and water lines. After installation of utilities, conventional internal and external wall, ceiling and floor covering members 30 are secured to panels 10 as shown in FIG. 1 to provide any desired appearance; the external covering members could include various sidings providing a clapboard or brick appearance, for example, and the internal covering members could include dry wall or wood grain members.

When covering members 30 are secured to flanges 14 of panels 10, the panels are converted into closed cell units which may be employed as air ducts and connected in an air flow loop with passive or forced air circulation, thereby providing integral heating, ventilation and air conditioning systems. The advantages of this building structure will be discussed below.

In general, the panels forming an exterior wall or roof section are assembled with their flanges 14 extending inwardly so that their major expanses 12 form the external wall and the superior insulating characteristics of foam cores 20 are employed to best advantage. However, one or more of the panels in a roof section having a southerly exposure are assembled with their flanges 14 extending upwardly. Each of these panels is then adapted to receive a module 32, shown in FIGS. 5 and 6, adapted to collect solar energy for heating the air flow through the air flow loop.

Each module 32 includes a roll formed frame 34 providing a supporting lip 36 which rests on and is secured to flanges 14 of the associated panel. Frame 34 also provides a support 38 for a glass covering member 30a and a support 40 for a solar energy absorber surface 42. A corrugated air center 44 is sandwiched below absorber surface 42 and has a plurality of louvers 46 lanced upwardly and downwardly to establish an efficient heat exchange region. Thus the solar energy absorbed by surface 42 is conducted and radiated to the air flow through the duct provided between glass covering member 30a and inner sheath 16.

Figures 5, 6:
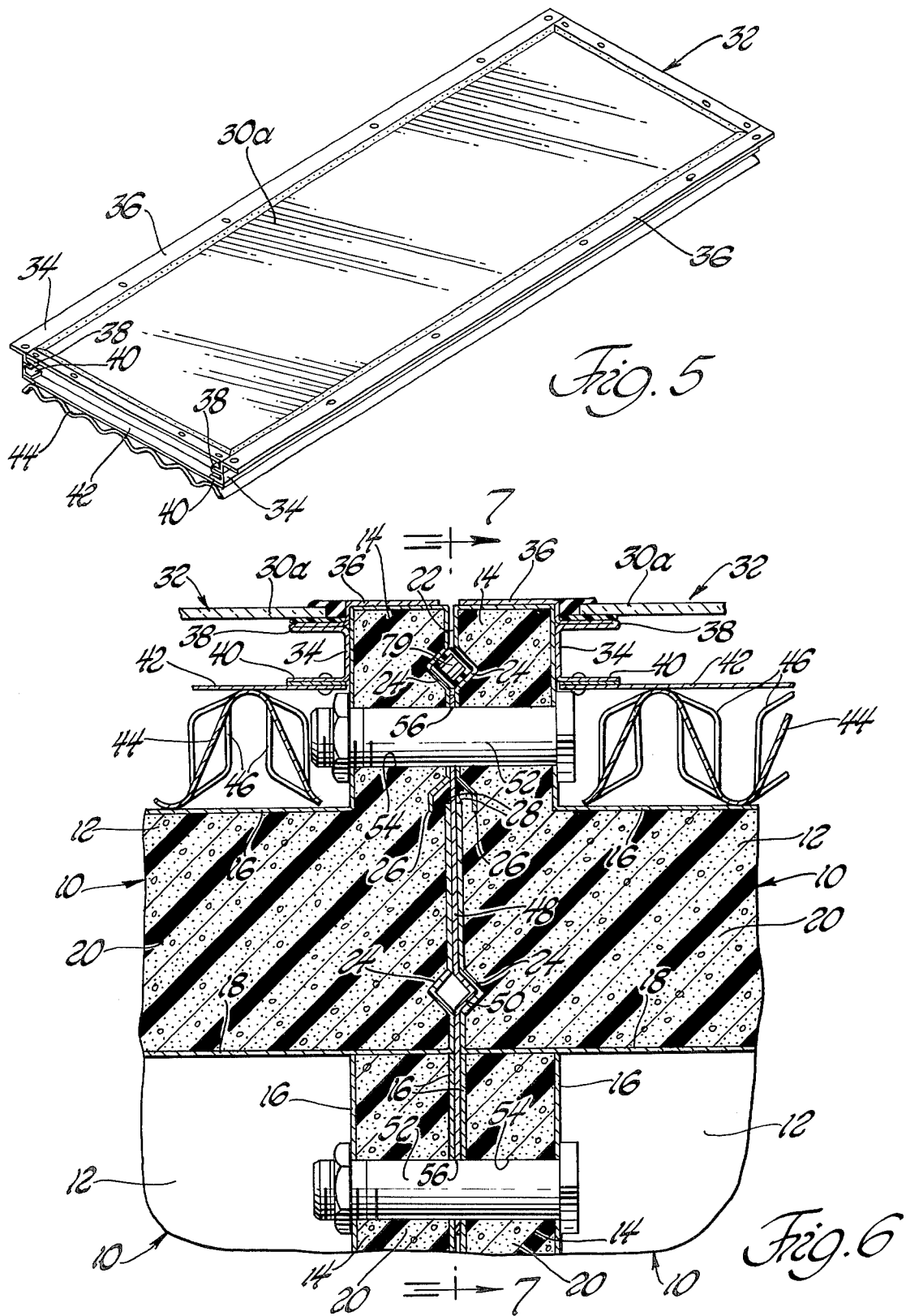
FIG. 5 is an isometric view of a module, adapted for mounting in the FIG. 2 panel, which collects solar energy to heat a flow of air directed therepast.
FIG. 6 is a sectional view, taken along line 6—6 of FIG. 7, of a joint between two roof panels and two wall panels showing how the various panels and the solar energy conversion module may be interconnected.
Figure 7:
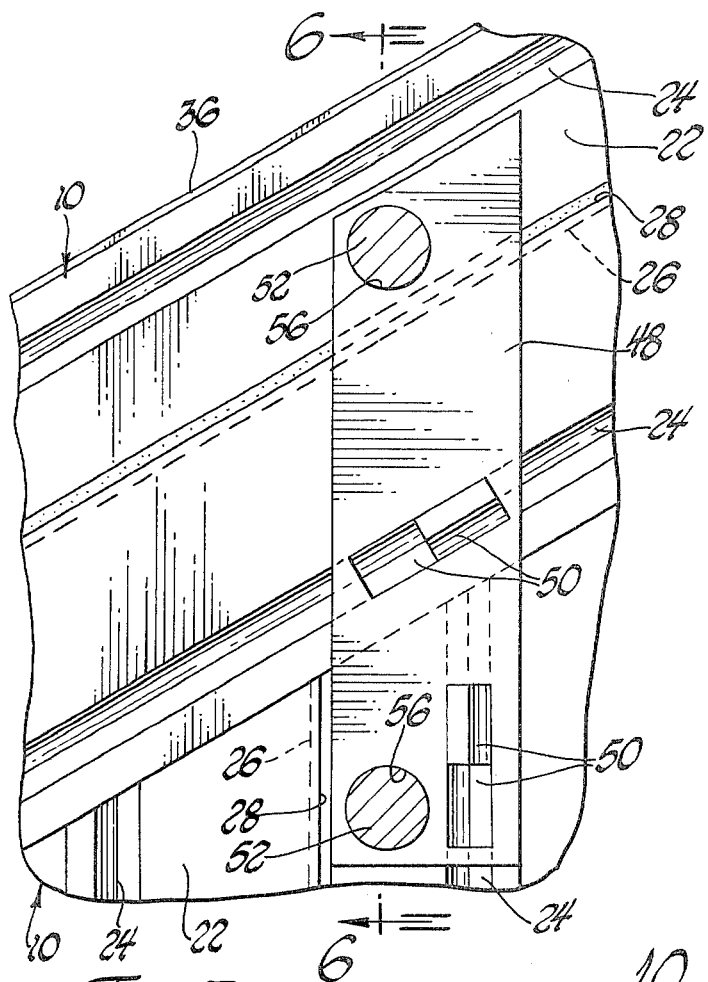
FIG. 7 is a view, taken along line 7—7 of FIG. 6, showing a plate which aligns the wall and roof panels.
Figure 8:
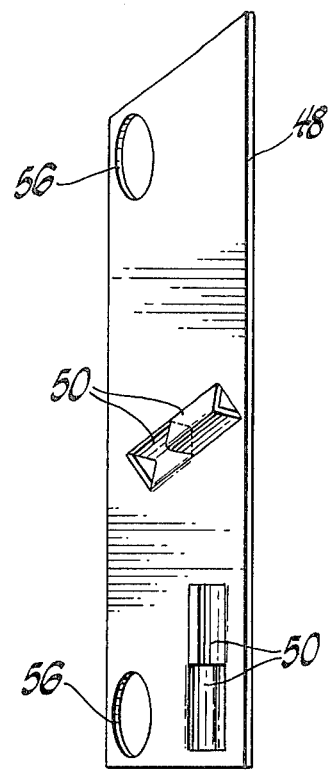
FIG. 8 is an angled view of the FIG. 7 plate particularly illustrating its oppositely directed projections which align the panels.

A plate 48, shown in FIGS. 6–8, aligns the wall and roof panels. Plate 48 has oppositely directed projections 50 which mate with the V-shaped grooves 24 in the lateral surface 22 of the panels to assure that the major expanses 12 of the panels in the wall and roof sections, respectively, are coplanar. After insertion of plate 48, bolts 52 are passed through apertures 54 in the flanges 14 of the panels and apertures 56 in plate 48 to retain panels 10 in a secure panel assembly.

Figure 9:
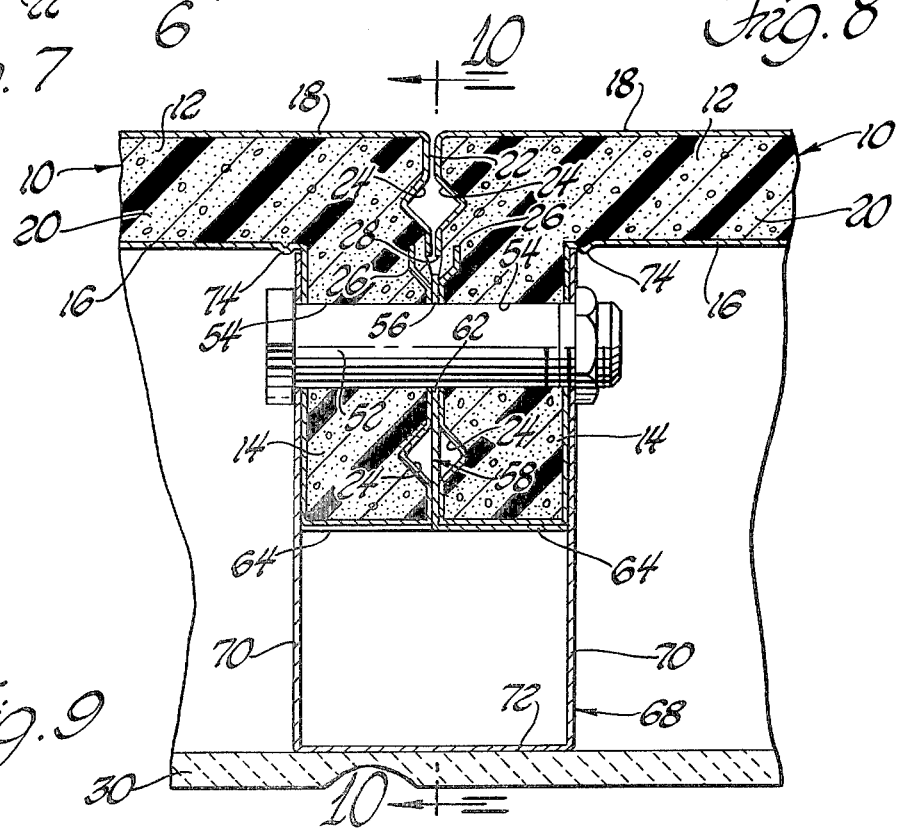
FIG. 9 is a sectional view, taken along line 9—9 of FIG. 10, of a joint between two floor panels, further showing a channel which may be employed to add beam strength.

FIGS. 9–11 show a plate 58 which aligns the wall and floor panels and supports the floor panels. The web 60 of plate 58 between the wall panels also has oppositely directed projections 50 which mate with the V-shaped grooves 24 in the lateral surfaces 22 of the wall panels. However, the web 62 of plate 58 between the floor panels is flat and carries a pair of horizontal tabs 64 which support the floor panels. Bolts 52 extend through apertures 54 in the flanges 14 of the panels and apertures 56 in plate 58 to retain panels 10 in a secure panel assembly.

It will be noted that, as shown in FIG. 10, web 60 of plate 58 also serves to align the splice 66 where the wall panels meet end-to-end.

Web 62 of plate 58 does not contain oppositely directed projections such as projections 50 in order that the flanges 14 of the floor panels may be received in a channel 68 which may be employed to add beam strength to the floor section. The side walls 70 of channel 68 embrace the flanges 14 of the floor panels and are retained by bolts 52, while the floor 72 of channel 68 supports the ceiling covering members 30.

As shown in FIG. 9, each of the panels has a bead 74 projecting downwardly parallel to and embracing a side wall 70 of channel 68 to restrain side walls 70 from flaring outwardly away from flanges 14.

A clip 76, shown in FIG. 12, has a vertical web 77 with oppositely directed projections 50 and a bolt aperture 56 which is adapted to be received between two wall panels at the base thereof. Clip 76 also has a horizontal tab 78 which is adapted for imbedding in or mounting on a foundation. Clip 76 will align a wall section on, and secure it to, a foundation.

It may be noted that the panels forming exterior wall and roof sections have thicker major expanses 12 than the panels forming interior wall and floor sections. It is suggested that the major expanse 12 of an interior wall or floor panel have a thickness of one inch (2.5 cm) and that the total thickness through the flange region of an interior wall or floor panel equal the approximately 3.5 inch (8.9 cm) width of a conventional 2×4 building stud. Similarly, it is suggested that the major expanse 12 of an exterior wall or roof panel have a thickness of three inches (7.6 cm) and that the total thickness through the flange region of an exterior wall or roof panel equal the approximately 5.5 inch (14 cm) width of a conventional 2×6 building stud. The additional thickness of the exterior wall and roof panels will enhance the superior insulating characteristics of the panel in the wall and roof sections where such are most beneficial, and the use of conventional building stud dimensions along the lateral surfaces 22 of the panels will allow conventional door and window units to be employed where desired.

It is contemplated that panels 10 will have a width of two feet (61 cm) so that a pair of panels 10 will interface with conventional wall covering members having a width of four feet (122 cm) and will be produced in a variety of standard lengths for wall, roof and floor applications; of course, panels 10 may be cut to any length desired in the factory or on the building site.

It is contemplated that the bolt apertures 54 in flanges 14 will be formed on six inch (15.2 cm) centers in the factory to facilitate construction on the building site. Some apertures 54 then could be used to feed power or other utility lines from one panel to another. It is evident, however, that apertures 54 could be cut in flanges 14 as needed on the building site or that apertures 54 could be partially pierced in the factory and completed on the building site as needed. Perforated or non-perforated sleeves may be inserted in flanges 14 to form apertures 54 if desired.

As shown in FIG. 6, a sealing strip 79 of rhombic cross section is inserted in the outer V-shaped grooves 24 during assembly of the exterior wall and roof sections to preclude entry of dirt, moisture and other foreign materials, and passage of air, between adjacent panels. Sealing strip 79 may comprise a metal rod provided with an elastomeric coating.

It was mentioned above that conventional wall, ceiling and floor covering members 30 are secured to panels 10. However, in some applications the covering members may not be necessary or desirable, and in those applications the inner and/or outer sheaths 16 and 18 may be left exposed.

Figure 13:
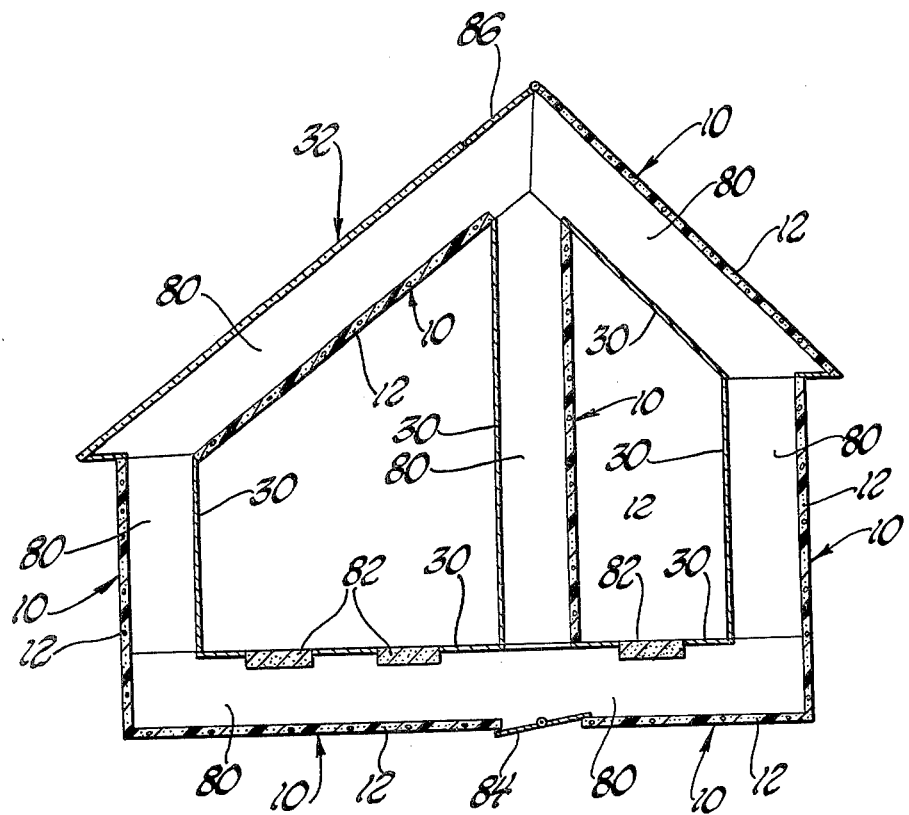
FIG. 13 is a schematic sectional view of a building structure formed from the improved panels, showing an air flow network within the structure.

One of the most significant benefits of the panel provided by this invention lies in its ability to create, with a covering member, a closed cell unit having an air duct therethrough. FIG. 13 schematically shows a building structure formed of a plurality of panels 10. One of the roof panels includes a solar energy conversion module 32 with a glass covering member 30a, and the remaining panels have interior wall, ceiling and floor covering members 30. Each panel 10 thus forms a closed cell unit having an air duct 80 which is connected in an air flow loop network. Air may circulate passively through the loop network due to convective forces, or it may be actively circulated by a blower.

During the sunlight hours of the winter season, air heated in the solar energy conversion module 32 will circulate through the loop network to heat the remainder of the building structure. Other panels may contain heat storage means, such as packages 82 of eutectic salts shown in FIGS. 1 and 13 which absorb heat during the sunlight hours. Then during the hours without sunlight, air circulating through the loop network will be heated by the eutectic salt packages 82 and will in turn heat other portions of the building structure.

During the summer season dampers 84 and 86 may be opened. Then during daylight hours warm air entering the air flow loop network past damper 84 will be cooled by eutectic salt packages 82 and will cool the remainder of the building structure before discharge past damper 86. During the night hours, cool air passing through the air flow loop network from damper 84 to damper 86 will receive heat from and regenerate the eutectic salt packages 82.

The eutectic salt technology may be used to even greater advantage if the eutectic salt material is disposed directly in floor covering members 30; separate packages 82 would not be required in that situation.

It will be appreciated that, during the night hours, solar energy conversion module 32 will radiate heat into the atmosphere and thus cool the air in the air flow loop network, and appropriate dampers may be employed to use that effect to its greatest advantage.

Figure 14:
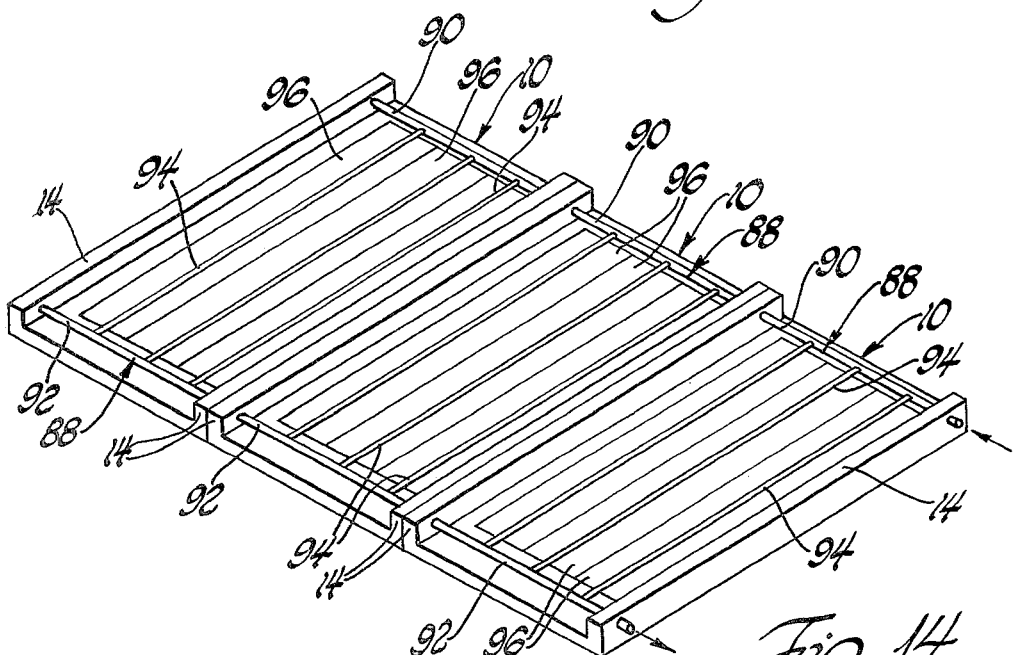
FIG. 14 is a schematic isometric view of three panels assembled to form a roof section of a building structure and provided with a system for using solar energy to heat water.

It also should be appreciated that an assembly of panels 10 forming a roof section of a building structure may be equipped with solar energy conversion modules other than the air heating module 32. For example, as shown in FIG. 14, a water heating solar energy conversion module 88 may have inlet and outlet headers 90 and 92 extending through flanges 14. Water introduced through header 90 may trickle through and be heated in tubes 94, which have solar energy absorber surface fins 96, and then be discharged from header 92.

In view of the foregoing, it will be appreciated that this invention may be employed in a variety of other embodiments within the scope of the following claims.

The embodiments of the invention in which an exclusive property or privilege is claimed are defined as follows:

1. An energy efficient building structure comprising:
   a plurality of structural panels wherein each panel includes a sheathed foam core formed into an open celled unit having a major expanse and a pair of flanges projecting from the plane of said expanse along opposite edges thereof,
   means securing a flange of each panel to an adjacent flange of another panel whereby the major expanses of said panels form an insulated self-supporting section of said building structure,
   covering members secured to the flanges of at least some of said panels generally parallel to the major expanses thereof to create closed cell units having air ducts therethrough,
   said building structure having an air flow loop extending between said ducts and another region of said building structure and being adapted to direct a flow of air through said loop.
   at least one of said closed cell units including heat transfer means for changing the temperature of air flowing through said loop in order to transfer heat to or from said region,
   and wherein said sheathed foam core limits heat transfer between the panel and said air flow to allow said air flow to rapidly transfer heat between said heat transfer means and said region.

2. An energy efficient building structure comprising:
   a plurality of structural panels wherein each panel includes a foam core formed into an open celled unit having a major expanse and a pair of longitudinally extending flanges projecting from the plane of said expanse along opposite edges thereof, an outer metal sheath covering a portion of said core and defining an outer surface and a portion of two substantially parallel and planar lateral surfaces of said panel, and an inner metal sheath covering the remainder of said core and defining an inner surface and the remaining portion of said lateral surfaces, each of said sheaths having a longitudinally extending edge along each of said lateral surfaces, one of said edges lying substantially in the plane of its associated surface, and the other of said edges being displaced inwardly from and extending in a substantially parallel, overlapping, spaced apart relationship with said one edge that protects said foam core while minimizing heat transfer between said outer sheath and said inner sheath,
   means securing a flange of each panel to an adjacent flange of another panel whereby the major expanses of said panels form an insulated self-supporting section of said building structure,
   covering members secured to the flanges of at least some of said panels generally parallel to the major expanses thereof to create closed cell units having air ducts therethrough,
   said building structure having an air flow loop extending between said ducts and another region of said building structure and being adapted to direct a flow of air through said loop,
   at least one of said closed cell units including heat transfer means for changing the temperature of air flowing through said loop in order to transfer heat to or from said region,
   and wherein said sheathed foam core limits heat transfer between the panel and said air flow to allow said air flow to rapidly transfer heat between said heat transfer means and said region.

* * * * *